US006336050B1

(12) United States Patent
Amin et al.

(10) Patent No.: US 6,336,050 B1
(45) Date of Patent: Jan. 1, 2002

(54) METHOD AND APPARATUS FOR ITERATIVELY OPTIMIZING FUNCTIONAL OUTPUTS WITH RESPECT TO INPUTS

(75) Inventors: Shara J Amin; Jose-Luis Fernandez-Villacanas Martin, both of Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/117,644

(22) PCT Filed: Feb. 3, 1998

(86) PCT No.: PCT/GB98/00335

§ 371 Date: Aug. 3, 1998

§ 102(e) Date: Aug. 3, 1998

(87) PCT Pub. No.: WO98/34188

PCT Pub. Date: Aug. 6, 1998

(30) Foreign Application Priority Data

Feb. 4, 1997 (GB) .................................... 9702243
Mar. 27, 1997 (GB) .................................... 9706402

(51) Int. Cl.⁷ .................................................. G05B 13/02
(52) U.S. Cl. ............................. 700/28; 700/19; 700/29; 700/30; 700/46; 700/52; 700/53; 318/561; 318/560; 705/7; 705/8
(58) Field of Search ............................. 700/2, 3, 18, 19, 700/28, 29, 30, 31, 32–33, 39, 40, 45–46, 47, 52, 53; 318/560, 561; 705/7, 8

(56) References Cited

U.S. PATENT DOCUMENTS

| 4,208,712 A | * | 6/1980 | Deutsch | 700/3 |
| 4,744,027 A | * | 5/1988 | Bayer et al. | 705/7 |
| 4,894,773 A | * | 1/1990 | Lagarias | 705/7 |
| 5,136,538 A | * | 8/1992 | Karmarkar et al. | 708/607 |
| 5,572,420 A | * | 11/1996 | Lu | 700/33 |
| 5,587,897 A | * | 12/1996 | Iida | 700/28 |

OTHER PUBLICATIONS

De La Maza M et al., "dynamic hill climbing (optimization algorithm)", AI Expert, Mar. 1994, USA, vol. 9, pp. 26–31.*
Atkinson A. C., "A segmented algorithm for simulated annealing", Statistics and Computing, Dec. 1992, UK, vol. 2, pp. 221–230.*
Brooks S. P. et al., "automatic starting point selection for function optimization", Statistics and Computing, Dec. 1994, UK, vol. 3, pp. 173–177.*

* cited by examiner

*Primary Examiner*—William Grant
*Assistant Examiner*—Ramesh Patel
(74) *Attorney, Agent, or Firm*—Nixon & Vanderhye P.C.

(57) ABSTRACT

An optimization process for optimizing inputs data relating to a function of a plurality of input-signals for which it is desired to find output values which give an optimum value of the function. Such output values are found by performing a plurality of cycles to reach a convergence, each of which cycles includes: (a) providing an old current value of each input signal, (b) selecting a test value of one or more input signals; (c) generating the function from the selected test values; and (d) selecting a new current value in dependence upon the relationship between the value of the function for the test value and the value of the function for the old current value. The test values include values close to old current values so as to move the input signal towards a local convergence for the output values. The finding of output values is adapted to perform the cycles such that in some but not all of the cycles, the test value of one or more input signals is selected to lie remotely within the range of the input signal to the old current value, so as to move the input signal towards a global convergence prior to completion of the local convergence.

34 Claims, 13 Drawing Sheets

METHOD AND APPARATUS FOR ITERATIVELY OPTIMIZING FUNCTIONAL OUTPUTS WITH RESPECT TO INPUTS

BACKGROUND OF THE INVENTION

1. Field of the Invention

This invention relates to a processor system arranged to optimise one or more signals.

2. Related Art

In many industrial applications, one or more input quantities (for example raw materials or signal values) are combined according to some predetermined process to produce an output quantity (e.g. a chemical composition, or a processed signal).

In general, the output is therefore a function of the input. In some cases, the function will be known, whereas in others it will not be known. In some cases, the function will linear, whereas in others it will be non linear. In some cases, the function will be well behaved, whereas in others it will include discontinuities.

For many types of function, an optimum output value (e.g. chemical yield, chemical composition, bit error rate of a process signal, or throughput capacity over a telecommunications network) is possible, corresponding to a predetermined optimum input value or, where there is more than one input, to a set of such input values, which may be considered to define an input vector.

In many types of function, there may be more than one such optimum value (which may either be a maximum or a minimum). Generally, one of these is the true optimum value (the global optimum value) and the others are local optima. It is generally desired to find the global optimum value, rather than local optima.

For simple analytical functions, such as a cubic function, it is possible to find the optima (in this case, for example, minima) by differentiating the function, to locate points of inflection; double differentiating the function, to determine which are minima; determining the value of the function at each such minimum; and selecting the lowest. However, this approach fails where the function is either unknown or ill-behaved, or both.

Two general numerical approaches which can deal with functions of these types are known. and will be referred to as "global" approaches and "local" approaches.

Global approaches include "brute force" search techniques; in such techniques, the function is evaluated at a large number of possible function values distributed over the range of possible input values, and the minimum is found directly.

Such an approach is possible for functions which depend on a small number of input variables, over a small range of those variables. However, for a large number of variables and/or a large variable range, the number of occasions on which the function must be solved (which is computationally intensive and time consuming) becomes very large, rendering such approaches slow and unsuitable for, for example, real time signal processing or network control applications.

On the other hand, "local" techniques start with one input vector position and "move" to a new vector position in a direction which optimises the function. Such techniques include Genetic Algorithms and Simulated Annealing processes. For example, where the optimum sought is a minimum, the search process may consist of determining the function value at input values spaced at either side of the starting point, determining whether either generates a function value lower than the starting function value, and selecting that which does so; and then repeating the process.

It will be seen that a process of this kind will continue to move the currently selected input value until a local minimum of the function value is found. However, with local search techniques of this kind, there is no guarantee that the global optimum will be found.

One known technique which attempts to reduce this problem within a local search scheme is known as "Dynamic Hill Climbing", as described in "Dynamic Hill Climbing", de la Maza and Yurate, AI Expert, March 1994 at pages 26–31.

In this scheme, each optimisation run is provided in two loops; an inner loop and an outer loop. The inner loop comprises a local search, arranged to find a local minimum. Once the local minimum has been found, the technique reverts to the outer loop, which determines another starting position (i.e. input value vector) and re-executes the inner loop. This process is repeated until most of the range of input values have been reviewed.

This technique was found useful for performing a co-ordinate change transformation for matching two sets of image data derived from computer topography or magnetic resonance imaging.

The present inventors have concluded that the Dynamic Hill Climbing technique, together with others, does not perform well on certain types of function, in which it does not find the global optimum within a reasonable number of iterations.

SUMMARY OF THE INVENTION

An aim of the present invention is to improve on the performance of such algorithms, at least for certain types of function. Accordingly, the invention finds application in many industrial fields; for example, in real time signal processing, or industrial process control. Particular embodiments of the invention comprise a multi-pulse linear predictive coder, an adaptive filter useful, for example, as an echo cancellor; an image transform generator (e.g. for matching two images or for performing a motion vector search); a chemical plant controller; a crystal structure modeller; and a telecommunications network management unit.

Accordingly, the present invention provides, in one aspect a processor system for optimising comprising: means for inputting data relating to a function of a plurality of input signals for which it is desired to find output values which give an optimum value of said function; means for finding said output values by performing a plurality of cycles to reach a convergence, each of which cycles comprises: providing an old current value of the or each input signal; selecting a test value of one or more said input signals; generating said function from said selected test value or values; selecting a new said current value in dependence upon the relationship between the value of the function for the test value and the value of the function for the old current value, said test values including values close to said old current values so as to move said input signal towards a local convergence; and means for outputting said output values; characterised in that said finding means is adapted to perform said cycles such that in some but not all of said cycles, said test value of one or more said input signals is selected to lie remotely within the range of said input signal to said old current value, so as to move said input signal towards a global convergence prior to completion of said local convergence.

BRIEF DESCRIPTION OF THE DRAWINGS

Other aspects and preferred embodiments will be apparent from the following description and claims, in which:

DETAILED DESCRIPTION OF EXEMPLARY EMBODIMENTS

Figure 1:
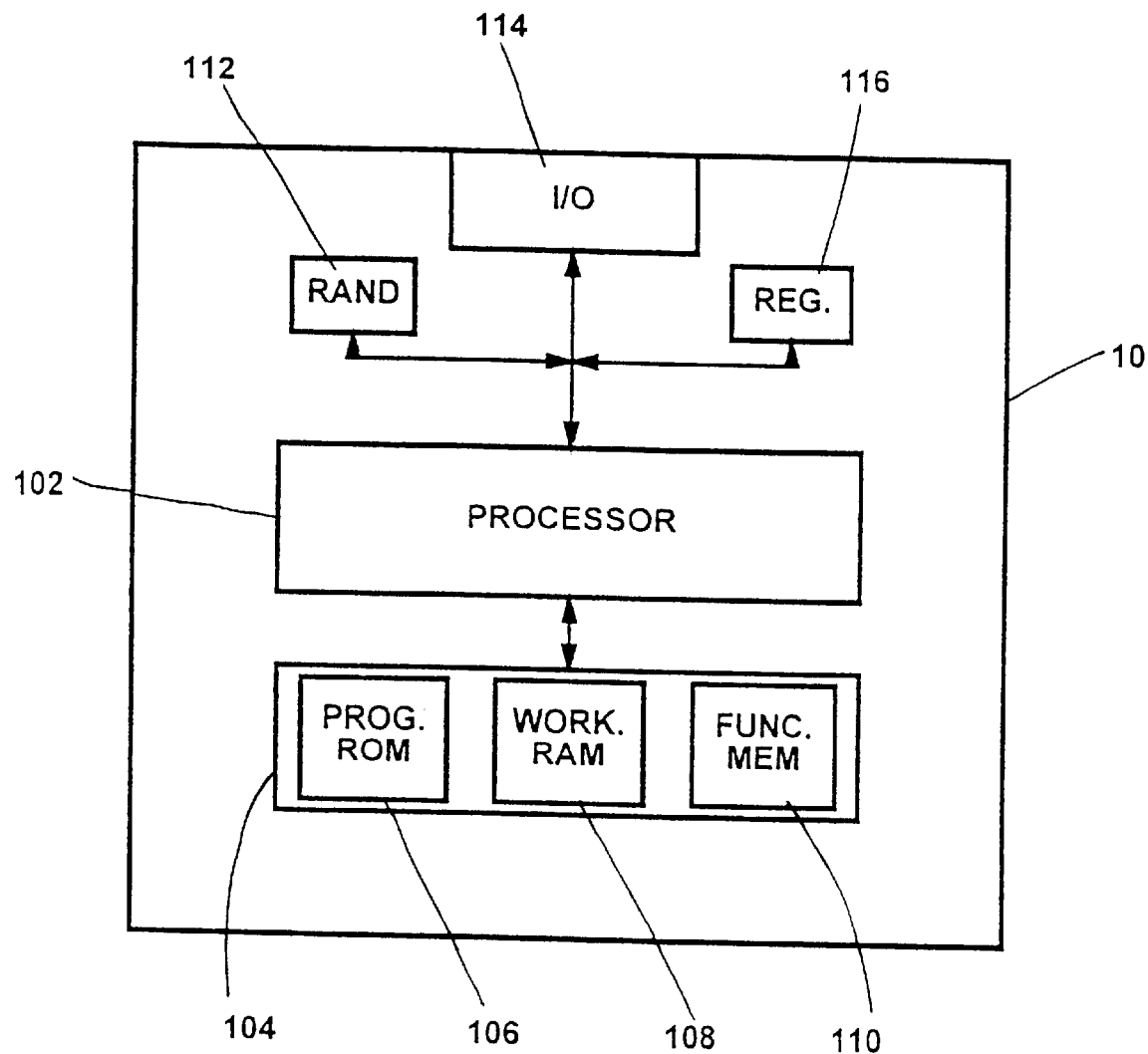
FIG. 1 is a block diagram of an embodiment of the invention.

Referring to FIG. 1, an optimiser 10 according to a preferred embodiment of the present invention comprises a processor 102 (for example an Intel™ Pentium™ microprocessor or a reduced instruction set (RISC) microprocessor), communicating via a bus (not shown), with a memory 104 comprising a program memory 106 (which may, for example, be a read only memory); a working or scratch pad memory 108 (which may, for example, be random access memory); and a function memory 110. The function memory 110 may be read only memory (ROM) where the optimiser is desired to solve only a single function, but is more normally random access memory (RAM) to permit the input of a new function. All three memories 106–110 may simply be partitioned areas within a common memory device 104, as shown.

Also provided are a random number generator 112 and a best solution storage register 116; these are shown as separate integers for clarity but conveniently in this embodiment the random number generator is incorporated within the processor 102 operating under control of the program memory 106 and the best solution storage register 116 is provided within the working memory 108.

Finally, an input/output interface device 114 is provided, at which data partly or completely defining a function to be optimised is received and supplied to the processor 102 and thence to the function memory 110; and at which the processor 102 makes available the input values and/or the optimal function value which will be derived as described hereafter.

Conveniently, the optimiser 10 may be provided as a suitably programmed personal computer or workstation, such as a Sun SparcStation™.

The operation of this embodiment will now be described with reference to the flowchart of FIGS. 2 and 3, and the illustrated function in FIG. 4.

Figure 2:
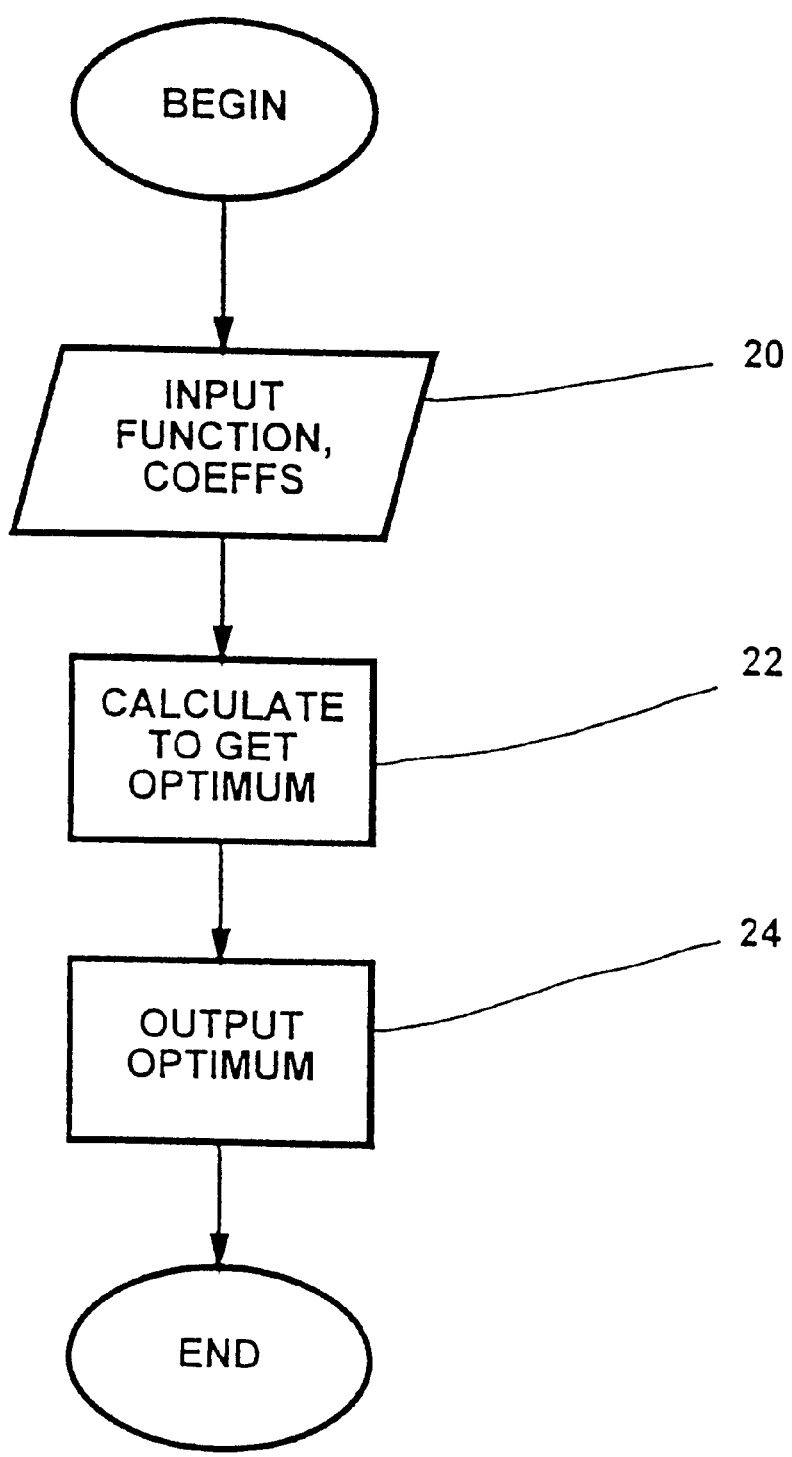
FIG. 2 is a flow diagram showing the overall operation of the embodiment of FIG. 1.

Referring to FIG. 2, in step 20 the processor 102 inputs the data defining the function to be optimised at the input/output interface 114, and stores the function to be optimised in the function memory 110. In the present embodiment, it will be assumed that the function data input comprises the typing in of the function at a keyboard comprised within the I/O interface 114, together with upper and lower ranges for each variable over which the function is to be optimised.

In step 22, the optimiser 10 calculates an optimum value for each input value, and in step 24 the processor 102 outputs the optimum values at the I/O interface 114.

Figure 3A:
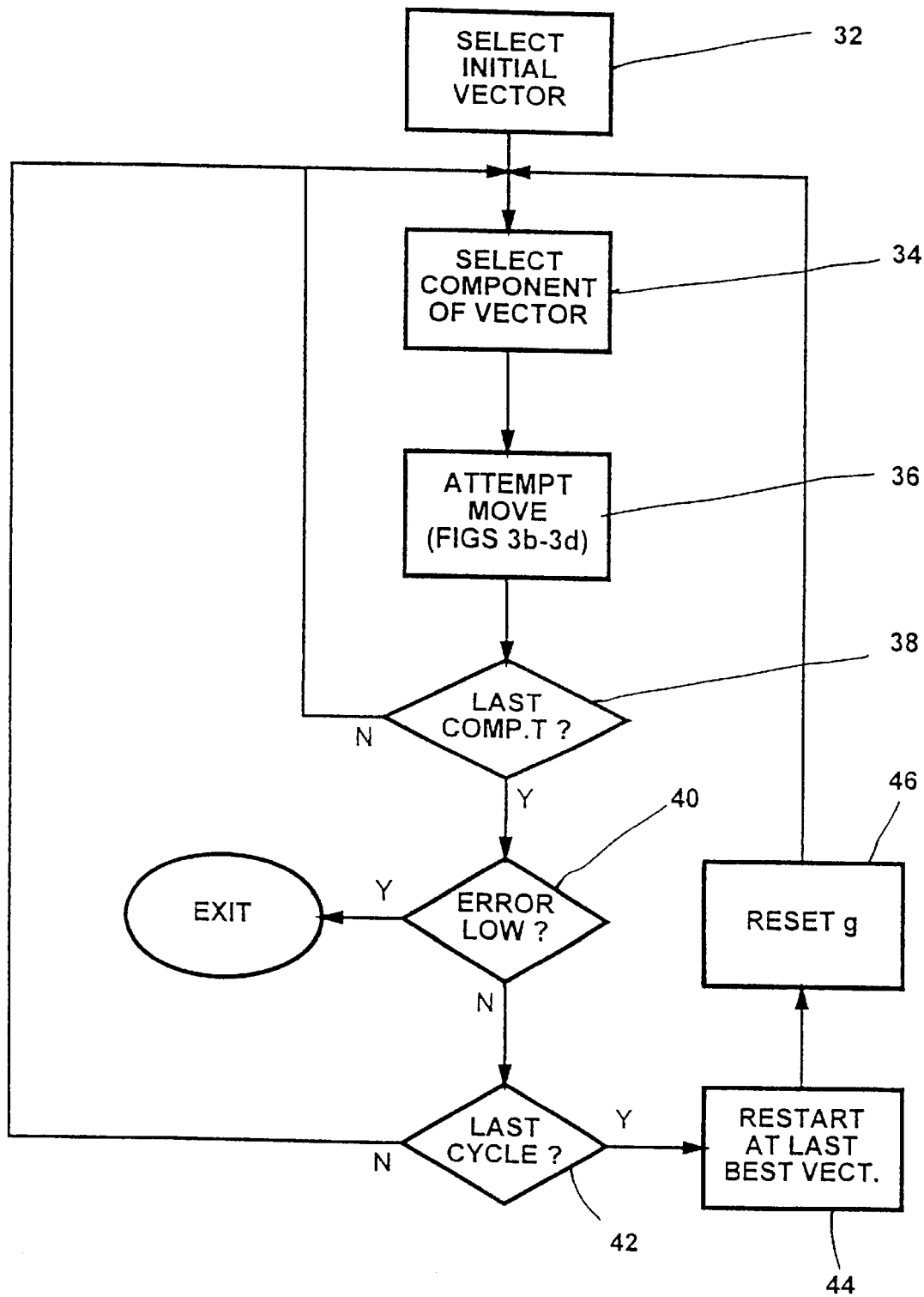
FIG. 3 (comprising FIGS. 3a to 3d) is a flow diagram showing in greater detail part of the operation of the process of FIG. 2.

Referring now to FIG. 3a, the process performed in step 22 will now be described in greater detail.

In step 32, an initial value for each of the input variables (i.e. input signals) is selected, so as to collectively comprise an input vector. The values may be randomly chosen within the range of each input, or may for example be the centre point of the range of each.

In step 34, a first input signal (i.e. a first component of the current input signal vector) is selected.

In step 36, the processor 102 decides whether or not to select a new signal value for that component and, if so, does so. This process will be described in greater detail below.

In step 38, the processor 102 determines whether the component just tested was the last component of the vector and, if not, returns to select the next component of the vector at step 34.

In step 40, the processor 102 determines whether the change in the value of the function over the last N cycles (where N is large predetermined number) has crossed a predetermined threshold over that number of cycles and, if not, the process of optimisation terminates and the processor 102 proceeds to step 24.

If the exit criterion is not met, then the processor 102 tests (step 42) whether a larger predetermined number of cycles M has expired and, if so, in step 44, the processor 102 selects as a new current vector value the stored value within the best value register 116 and resets a convergence parameter g (step 46) which will be discussed in greater detail below. The processor then returns to step 34 to repeat the process from the new starting point.

Figure 3B:
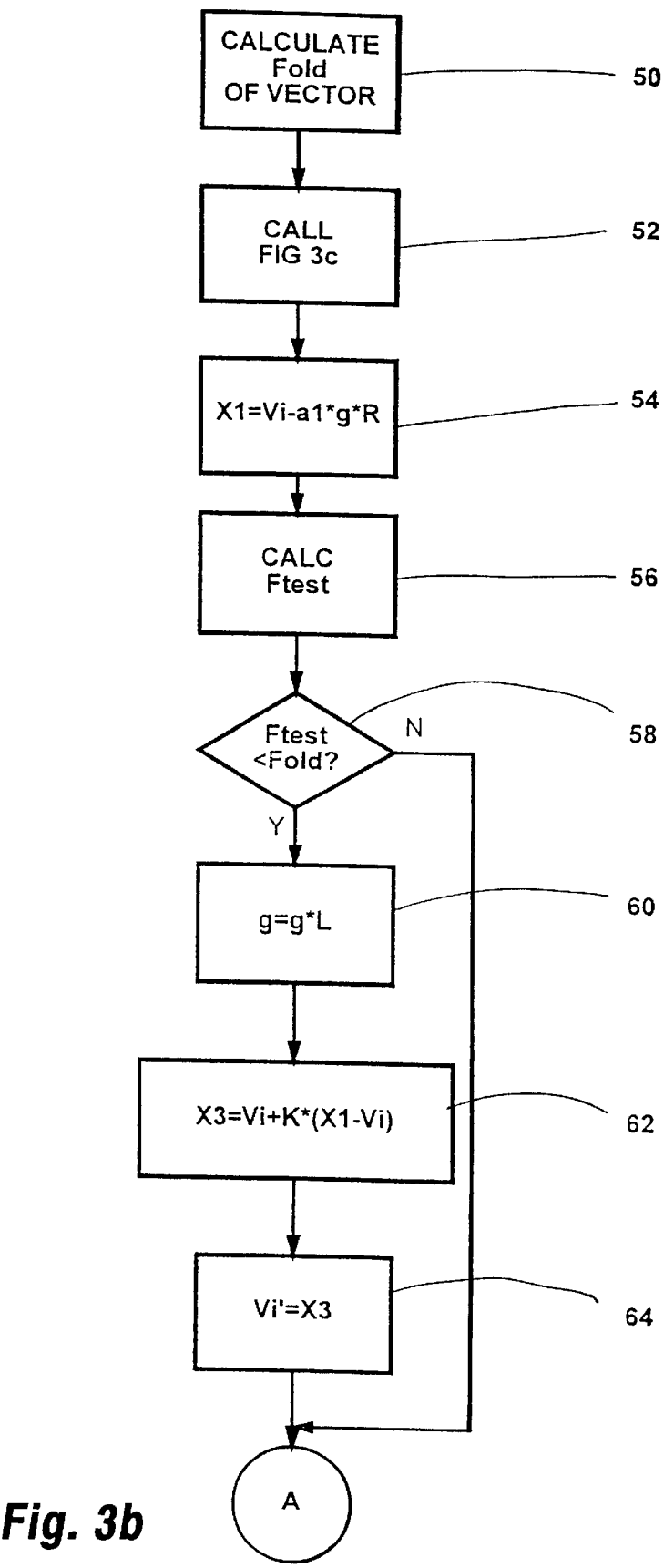
Figure 3C:
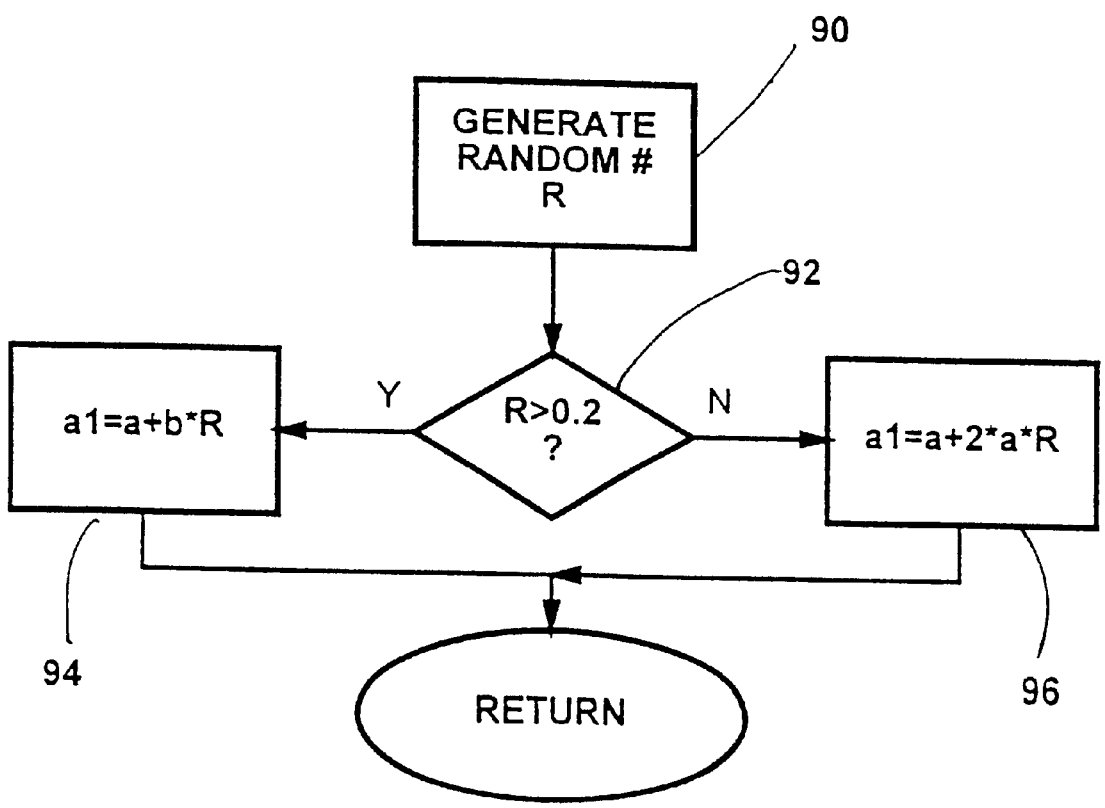

Referring to FIG. 3b, within each cycle, the process of determining whether to move, and doing so, will now be described in greater detail, with particular reference to the function illustrated in FIG. 4, in which the optima are minimum.

In a step 50, the processor 102 calculates the value of the function $F_{old}$ of the current vector. In a step 52, the processor 102 generates an offset from the current signal value, by the process of FIG. 3c, comprising generating a pseudo random number R having an amplitude between 0 and 1 via the random number generator 112 in a step 90, testing whether the random number lies above 0.2 in a step 92; if so (as will be the case during 80% of cycles on average), generating the offset $a_1$ as the sum of a predetermined constant a having a low value relative to the range of the component signal, and the product of the random number R and a second predetermined constant b equal to (or, in general, comparable in magnitude with) the input range of the component signal.

If the random number lies below 0.2 in step 92 (as will be the case on 20% of the cycles) the processor proceeds to calculate the offset $a_1$ in accordance with step 96, as the sum of the predetermined constant and the product of the predetermined constant a and twice the random number R.

Thus, the. random number R is here being used for two different purposes; firstly, to select whether a local or a global test is performed in the current cycle (the ratio of the total number of local to global tests being set by the threshold used in the step 92), and secondly to select the magnitude of the offset of a test input signal value from the current input signal value.

If a local test is to be performed as a result of the determination in step 92, then the offset $a_1$ from the current input signal is determined randomly by the random number R, but its range is constrained to lie close to the current value by the constant a in step 96, whereas if the test is to be global test the offset $a_1$ is determined in step 94 randomly to lie within a much greater range comparable to that of the input signal by the constant b.

In step 54, a first test value $X_1$ is calculated as the current signal component value $V_i$ less the offset $a_1$ multiplied by the random number R and by a convergence factor g, which starts with a value close to unity.

Figure 4A:
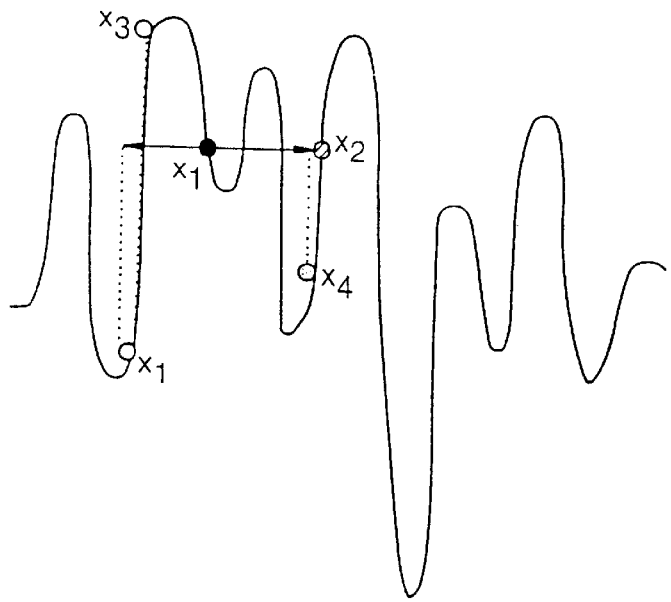
FIG. 4 (comprising FIGS. 4a to 4c) is an example of a function used to illustrate the process of FIGS. 2 and 3.
Figure 4B:
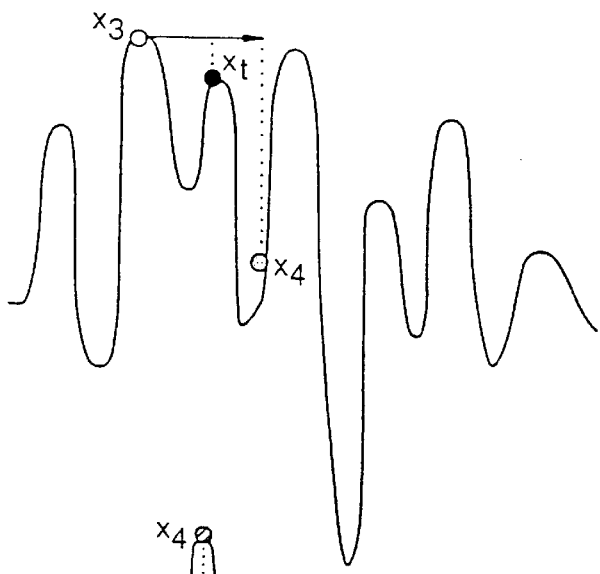

In FIG. 4a, the current value of the input signal vector component $V_i$ is shown as a dark circle. It will be seen that the current value lies close to a local minimum in the function, but with deeper local minima to either side, and a global minimum still further to the right (at a still higher value of the input signal component $V_i$).

In step 56, the processor 102 calculates the value of the function at the test point $X_1$. From FIG. 4a, it will be seen that this value lies close to a deeper local minimum than the current value.

In step 58, the processor compares the test value just calculated with the current function value calculated in step 50. If the test value is lower than the current value, then in step 60 the processor 102 reduces the value of the convergence term g by multiplying it by a constant L having a value slightly less than unity. This will reduce the range which the offset of the test function point $X_1$ collector can take in subsequent cycles, and hence make the search less "global" and more "local".

In a step 62, the processor then calculates a new current value, $X_3$, for the vector component by adding to the current value a fraction (determined by the value of a predetermined fixed constant K substantially less than unity) of the difference, $(X_1-V_i)$ between the test value and the old current value.

In a step 64, the current value of the input signal component $V_i$ is therefore set to the newly calculated value $X_3$.

It will be seen from FIG. 4a that this new value of the input signal is less optimal than the previous current value. However, it has moved the current value towards a more optimal point, namely $X_1$. Thus, the described process permits the current value to "climb" out of a local minimum and towards a global minimun, whilst moving sufficiently slowly to enable some eventual convergence.

Figure 3D:
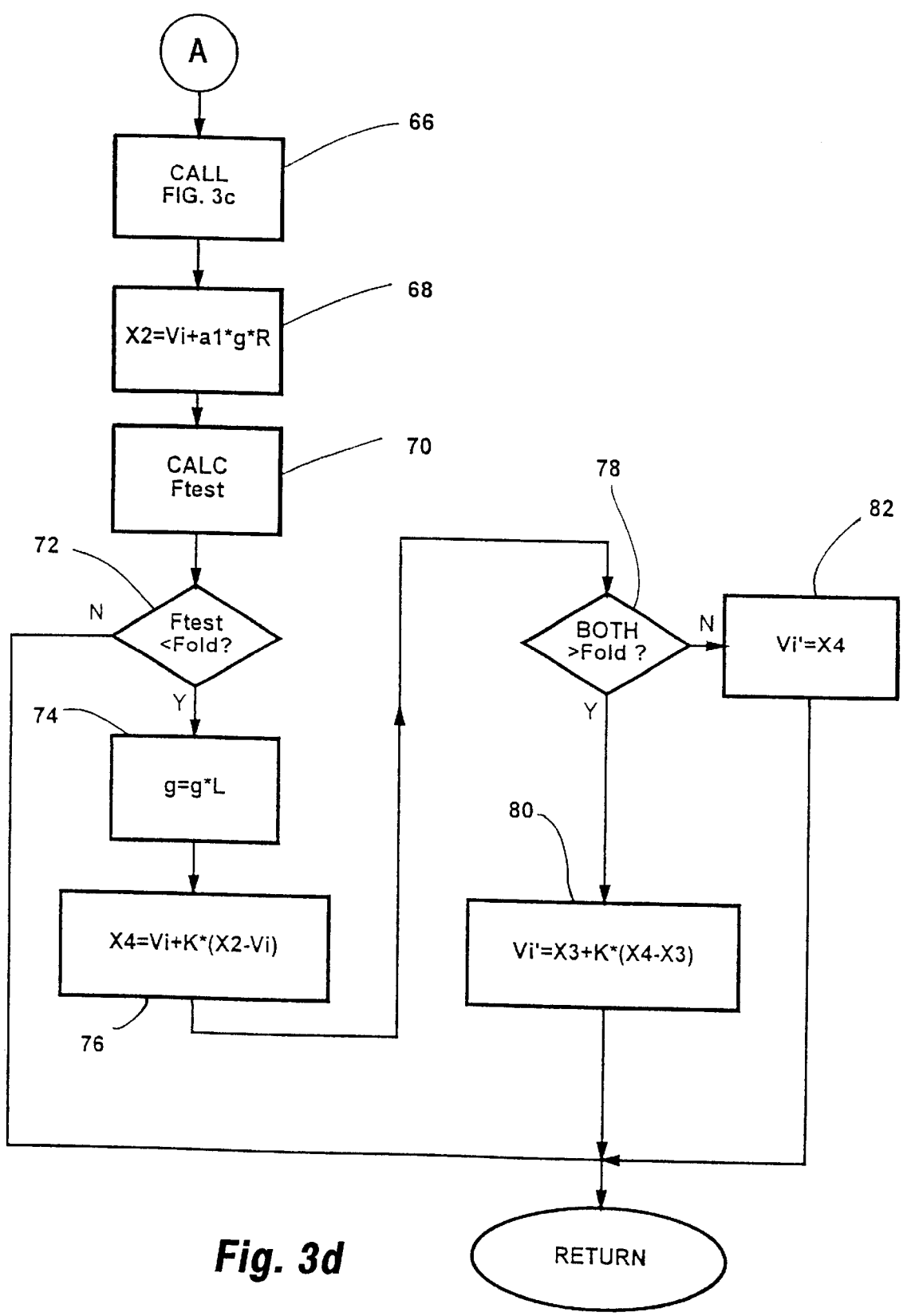

Referring now to FIG. 3d, to ensure that the whole range of the input signal component is searched and not just the lower part, a further test value $X_2$ on the opposite side of the previous current value is next calculated. In step 66, the offset $a_1$ is calculated by repeating the process of FIG. 3c, and in step 68, a new test value $X_2$ higher than the old current value is calculated, much as described in relation to step 54, but by adding (rather than subtracting) the product of the offset $a_1$, the convergence factor g and the random number R to the old current value $v_i$ of the signal component.

In step 70, the value of the function is calculated by the processor 102 at the test point $X_2$, substantially as described in relation to step 56.

In step 72, the value thus calculated is compared with the previous test value calculated at step 50 above, and if (as shown in FIG. 4a) it lies (somewhat) below the old value $F_{old}$ of the function at the previous current input signal, then the convergence constant g is reduced as described in relation to step 60 above, and a new position $X_4$ is calculated exactly as described in relation to the position $X_3$ in step 62 above, but utilising the test position $X_2$ in place of the test position $X_1$.

In a step 78, the processor 102 determines whether the function values at both test positions $X_1$ and $X_2$ were lower than the function value at the previous current signal value, calculated at step 50. Where, as here, this is the case then in step 80 the next current value of the signal component $V_i$ is calculated as:

$$Vi'+X3+K*(X4-X3)$$

It will be seen that this corresponds substantially to the calculation performed in steps 76 and 62 to determine the positions $X_3$ and $X_4$; the only difference is that instead of using the current value of the input signal $V_i$ from the previous cycle, the value $X_3$ is used, corresponding to a shifted position of the input value towards the point $X_1$. Thus, some convergence movement within a cycle takes place.

It will be seen that the effect of this is to move the value of the signal out of the local minimum within which it was initially located and into a deeper minimum, before it can converge within the previous local minimum. This feature of the invention thus permits rapid convergence on a global minimum.

Where the processor 102 determines, in step 78, that the value of the function at the test point $X_2$ is lower than the value at the previous current value of the input signal, but the value of the function at the other test point $X_1$ was not, then the new current value of the input signal is calculated, in step 82, to be equal to the position $X_4$ calculated in step 76 above.

Where, in step 58 or step 72, it is determined by the processor 102 that the value of the function at the current position is more optimal than that at the test position, then the value of the current position is left unchanged (i.e. the test position plays no part in determining the next current value).

Figure 4C:
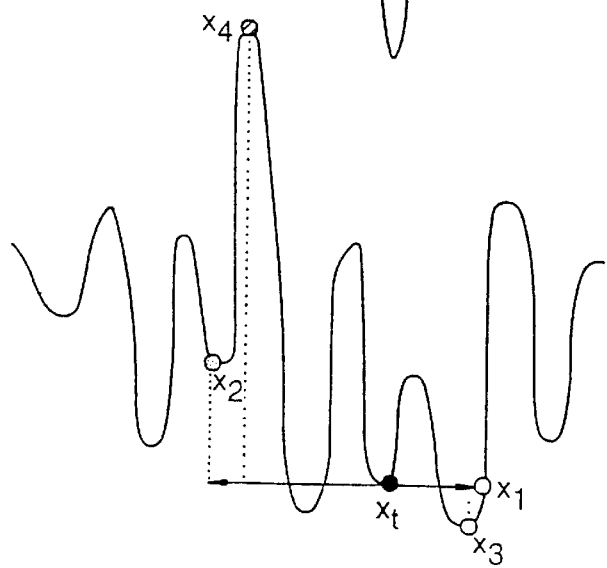

FIG. 4c shows an alternative starting situation, in which the test value $X_1$ is no lower than the initial value, but the test value $X_2$ is lower than the initial function value. In this case, the value $X_3$ is not used, and the next current input value is $X_4$, which as shown happens to lie at the bottom of the global minimum of the function. It is noteworthy that the present embodiment does not attempt to converge on the nearer local minimum.

The process of FIG. 3 then continues with the next component of the input signal vector at step 34 of FIG. 3a.

It will therefore be seen that the process of FIG. 3 corresponds to perturbing each input signal (i.e. input variable or component of the input signal vector V) along opposite directions, the amplitudes of the perturbations being different from each other and from one iteration to the next.

The size of the perturbation explores areas of the range of each signal component local to the current value for a fixed percentage at the time, and globally for the remaining cycles. The embodiment therefore explores local and global areas simultaneously, permitting local regions to be searched in detail, but to escape from local minima before excessive cycles have been spent converging. The process can therefore move "uphill" out of local minima, as well as "downhill" into them, where a deeper minimum occurs elsewhere within the range of a signal component.

The above described embodiment was applied to the five test functions created by De Jong, which are described in the above referenced article by de la Maza and will not be farther described in detail here. For comparative purposes, the tests were repeated with the Dynamic Hill Climbing (DHC) algorithm described in that paper and a genetic algorithm (GA), and the results are reproduced below:

| Test | Function | DLS | DHC | GA |
|------|----------|-----|-----|------|
| 1 | Sphere | 124 | 223 | 560 |
| 2 | Saddle | 2624 | 513 | 310 |
| 3 | Step | 103 | | 100 |
| 4 | Quartic | 97 | 178 | 2200 |
| 5 | Foxholes | 294 | 129 | 1100 |

In the above, 'DLS' indicates the results obtained by the present embodiment. The present invention converged in 103 function evaluations for the third test function (a step function which has long flat surfaces surrounded by discontinuities), whereas it was found that the Dynamic Hill Climbing algorithm would not converge.

It will therefore been that the present invention outperformed the DHC algorithm in 4 of the 5 cases. The performance was less good on the second test function (a saddle function with a curving valley) which has few local minima and is relatively smooth.

Thus, relative to the Dynamic Hill Climbing algorithm, the above described embodiment gives an improved performance for functions with local minima, or with flat portions and/or discontinuities.

It has particularly been found that the present invention is a substantial improvement over many local search optimisation techniques for functions of the type including flat areas, because local search techniques find greater difficulty in escaping from such flat areas or in optimising to a local minimum within a given flat area, whereas the present invention will encounter no such difficulty.

This makes the present invention suitable for, for example, heavily quantised output functions where the output function is represented only by a few levels, for example a few bits (as in A-law PCM). It is therefore anticipated that the invention will find use in applications such as low bit rate signal coding where heavily quantised outputs exist, but will also be useful in computing applications in general since quantisation due to digital representation, clipping of the range or the like may be an important factor.

Figure 5:
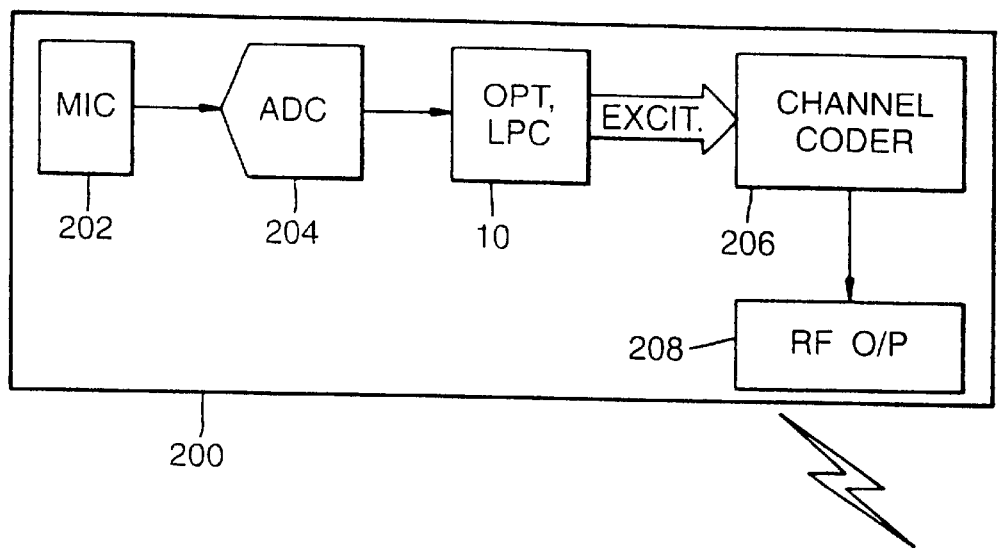
FIG. 5 is a block diagram showing an embodiment of the invention incorporating the embodiment of FIG. 1.

FIG. 5 shows an embodiment of the invention comprising a communications terminal 200 (e.g. a digital cellular telephone). The telephone comprises a microphone 202, the output of which is fed to an analog digital converter 204, digitised speech from which is supplied to an optimiser unit 10 (embodied in, for example, a digital signal processor chip which also performs linear predictive coding (LPC) as described in "Linear Predictive Coding, a Tutorial review", by John Makhoul, Proc. IEE, Vol. 63, No. 4, April 1975). As is well known, the technique of linear predictive encoding a low bit rate speech coding technique comprises analysing speech signals to determine a set (for example, 12) of filter parameters which correspond to the tap weights of a filter which, when excited by an excitation signal, will reconstruct the original speech signal.

One particular type of linear predictive coding is known as multi-pulse linear predictive coding (MPLPC). In MPLPC, the excitation consists of a series of pulses, the positions in time of which (and, in some cases. the amplitudes of which) are determined by optimisation, by testing various pulse positions, re-synthesising the signal using the already determined LPC coefficients and those pulse positions, and comparing it with the original speech signal. Those pulse positions which give the lowest squared error are selected, and the pulse positions and amplitudes thus determined are passed, together with the LPC coefficients, to a channel coder 206 which performs channel coding such as TDMA or CDMA encoding followed by error correcting encoding (e.g. convolutional, block or turbo. coding). The encoded filter parameters and excitation are then supplied to an RF output stage 208 at which they are modulated onto a radio frequency signal and transmitted through an antenna.

Figure 6:
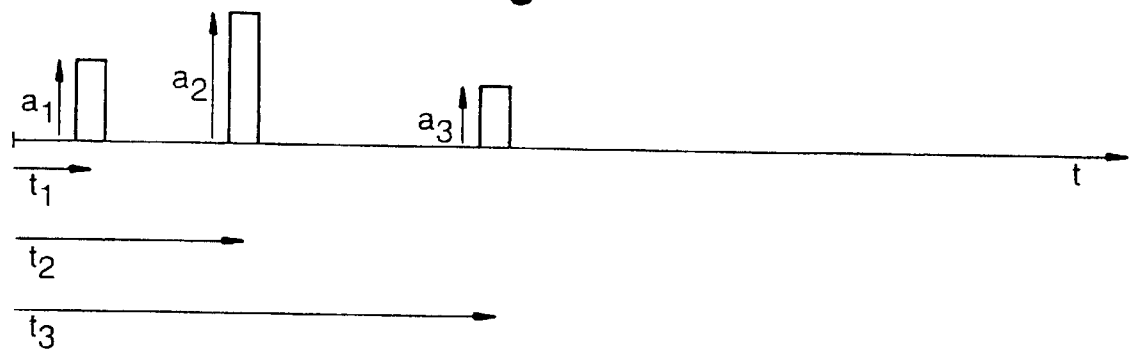
FIG. 6 is a diagram of pulse positions employed in the embodiment of FIG. 5.
Figure 7:
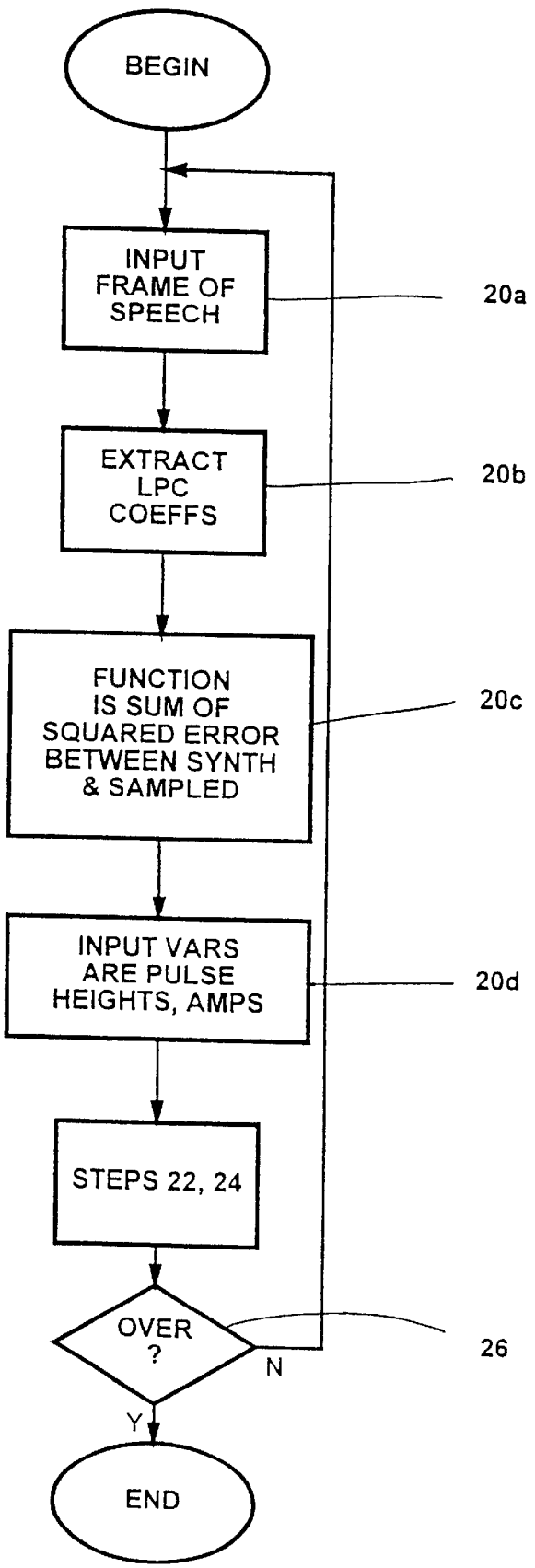
FIG. 7 is a flow diagram showing the process of operation of the embodiment of FIG. 5.

Accordingly, the present invention is employed to optimise the position and amplitudes of the pulses, illustrated in FIG. 6, making up the excitation. This is done by the process of FIG. 7, which represents a modification of the process of FIG. 2.

In a step 20a, a frame of successive speech samples are input from the analog to digital converter (for example, 20 milliseconds of samples).

In a step 20b, a set of LPC filter coefficients are extracted in conventional fashion.

In a step 20c, the function to be optimised (minimised in this case) is set as the sum of the square of the errors between each input digitised speech sample of the frame, and the corresponding synthesised speech sample produced by applying the LPC coefficients to a given input vector (step 20d) comprising the set of pulse positions and amplitudes making up the excitation.

The optimiser 10 then proceeds to steps 22 and 24 of FIG. 2, to find optical pulse positions and amplitudes; i.e. those pulse and amplitudes which minimise the error between the synthesised speech and the input sample speech. These are then transmitted to the channel coder for subsequent transmission. If (step 26) speech is detected no longer to be present at the microphone, the process terminates. If speech is detected as present, however, the process of FIG. 6 returns to step 28 to extract a further frame of digitised speech.

Figure 8:
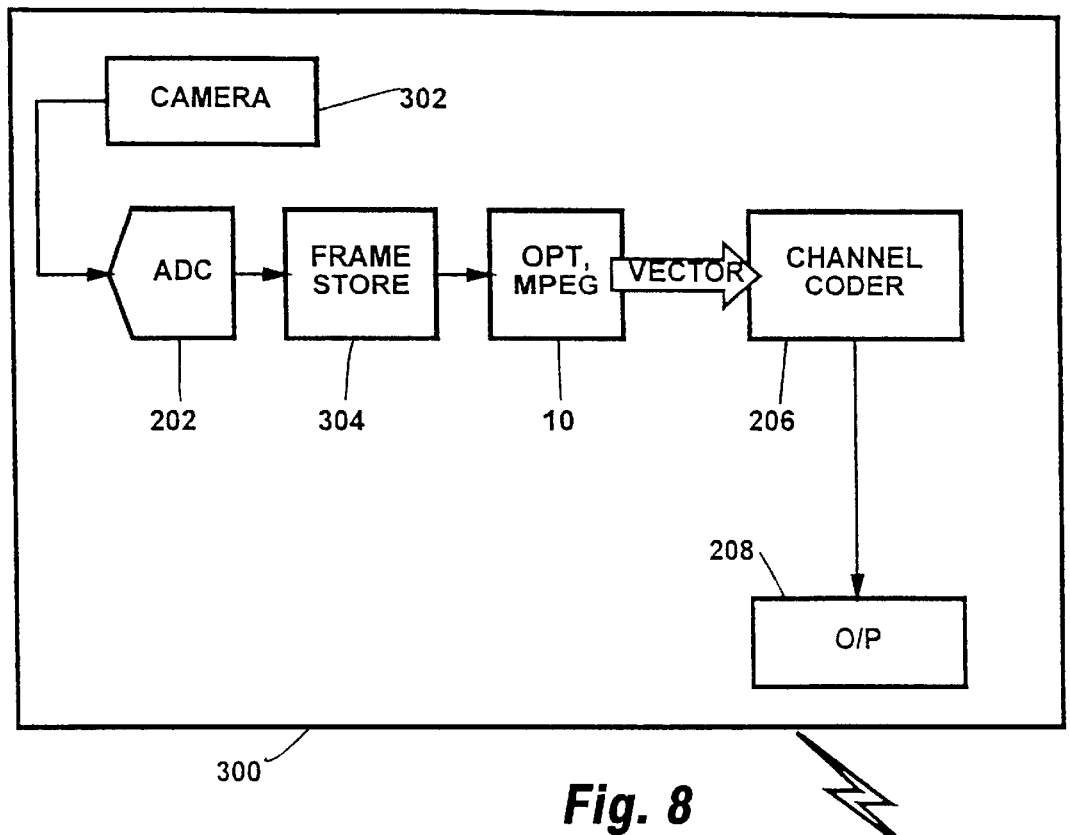
FIG. 8 is a block diagram showing a further employment of the invention incorporating the embodiment of FIG. 1.

FIG. 8 shows a further embodiment of the invention comprising a motion compensated video coder used in, for example, a video telephone of video conference unit. In such coders, as is well known, the main reason for the change from picture to picture is the motion of, for example, a human face within the image. It is therefore possible to achieve a substantial reduction in the volume of data to be transmitted by locating the "motion vector"; in other words, the combination of vertical and horizontal offset values, in pixels, which indicate how much a portion of the image has moved from one frame to the next, and to send this motion vector together with other data encoding the frame to frame change (for example, using the moving picture expert group or MPEG standard).

Accordingly, this embodiment comprises a camera 302, the output of which is fed to a video ADC 202 which supplies successive video samples to a frame store 304 in which an entire image is stored. The address within the frame store of a pixel at a position X, Y within the image will therefore be N*Y+X, where N is the number of pixels per line. The frame store also retains the previous image frame.

The optimiser 10 of the present invention is arranged to read data from the frame store 304 and to extract a motion vector comprising X and Y position offset values. The same device is arranged to perform MPEG video coding, as is well known in the art. The motion vector and MPEG data are supplied to a channel coder 206 where channel coding is applied and thence to an output port 208 for transmission.

Figure 9:
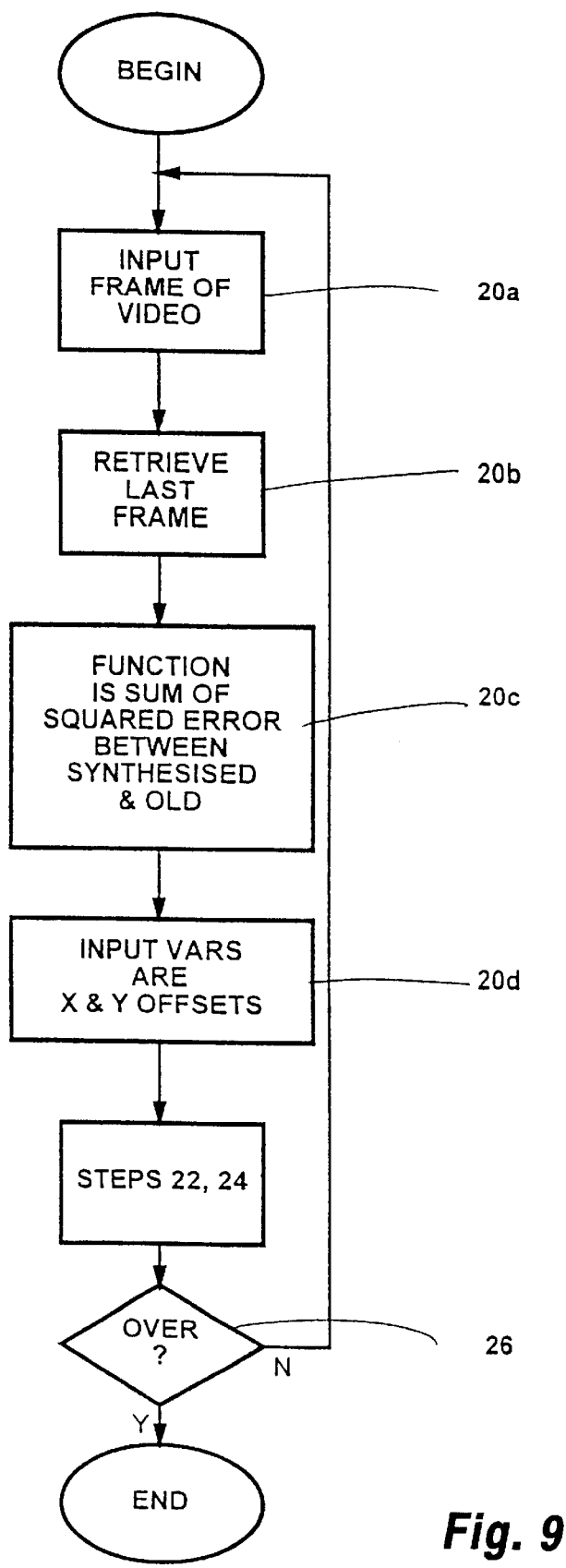
FIG. 9 is a flow diagram showing the operation of the embodiment of FIG. 8.

Referring to FIG. 9, the process of FIG. 2 is performed as follows. In a step 20a, a new frame of video data is input and in a step 20b, the previous frame of data is accessed. In a step 20c, the function to be minimised is set as the sum of the squared errors between the corresponding pixels of the previous frame and synthesised pixels created by decoding MPEG encoded video data created from the difference between pixel values of the previous frame and those of the current frame when shifted by a motion vector, the X and Y components of which form the inputs to this function to be optimised (i.e. minimised in this case).

The process then proceeds to step 22 and 24 of FIG. 2, to test various values of X and Y offset and return those which result in the minimum error between the previous video frame and that which would be synthesised by decoding the MPEG encoding image with that motion vector.

It will be apparent that other embodiments of the invention may also be provided to find an optimum offset between two portions of a signal. For example, the invention may be employed within an echo cancellor, as a means of finding the length of the echo to be cancelled; in other words, the time offset between a reference impulse and its echo. This corresponds to a search for a time offset for which the sum of the squares of the differences between signal values, and corresponding signal values shifted by that offset, is minimal. In other words, the invention may be used to locate the maximum correlation within a time domain signal, and may therefore also find application in related devices such as sonar or radar units.

Figure 10:
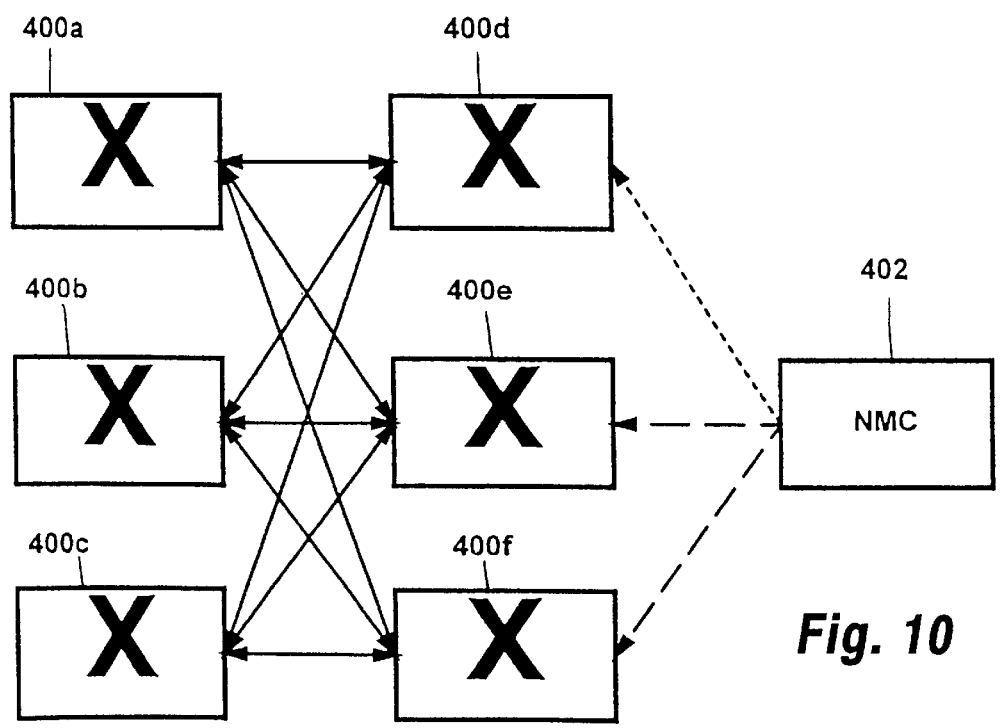
FIG. 10 is a block diagram showing a further embodiment of the invention incorporating that of FIG. 1.

Referring to FIG. 10, in another embodiment the present invention comprises a network management centre (NMC) 402 within a telecommunications network comprising a plurality of interconnected exchanges 400a–400f. The NMC is connected via a signalling link to each of the exchanges 400a–400f (the connections to the exchanges 400a–400c are omitted here for clarity). The NMC is thereby able to control the routing performed at each of the exchanges 400a–400f, for example to vary routing tables held at those exchanges, so as to control the passage of a call through the network.

The NMC monitors the traffic at each of the exchanges 400a–400f and controls the routing so as to achieve a desired distribution of traffic. This may be achieved by minimising a cost function, the inputs to which are the routings between the exchanges 400a–400f, the cost function being calculated in accordance with the traffic loadings which would be produced by those routings, weighted by other cost factors such as the length of the path through the network, and the relative actual costs of using particular channels such as fibre optic or satellite channels. The network management centre 402 therefore comprises a computer, receiving as inputs the current loadings at exchange and other factors such as the current capacity at each exchange, and performing an optimisation to calculate allocation of traffic, the inputs to the function being the routing control data to set up the routing tables in each exchange 400a–400f.

Figure 11:
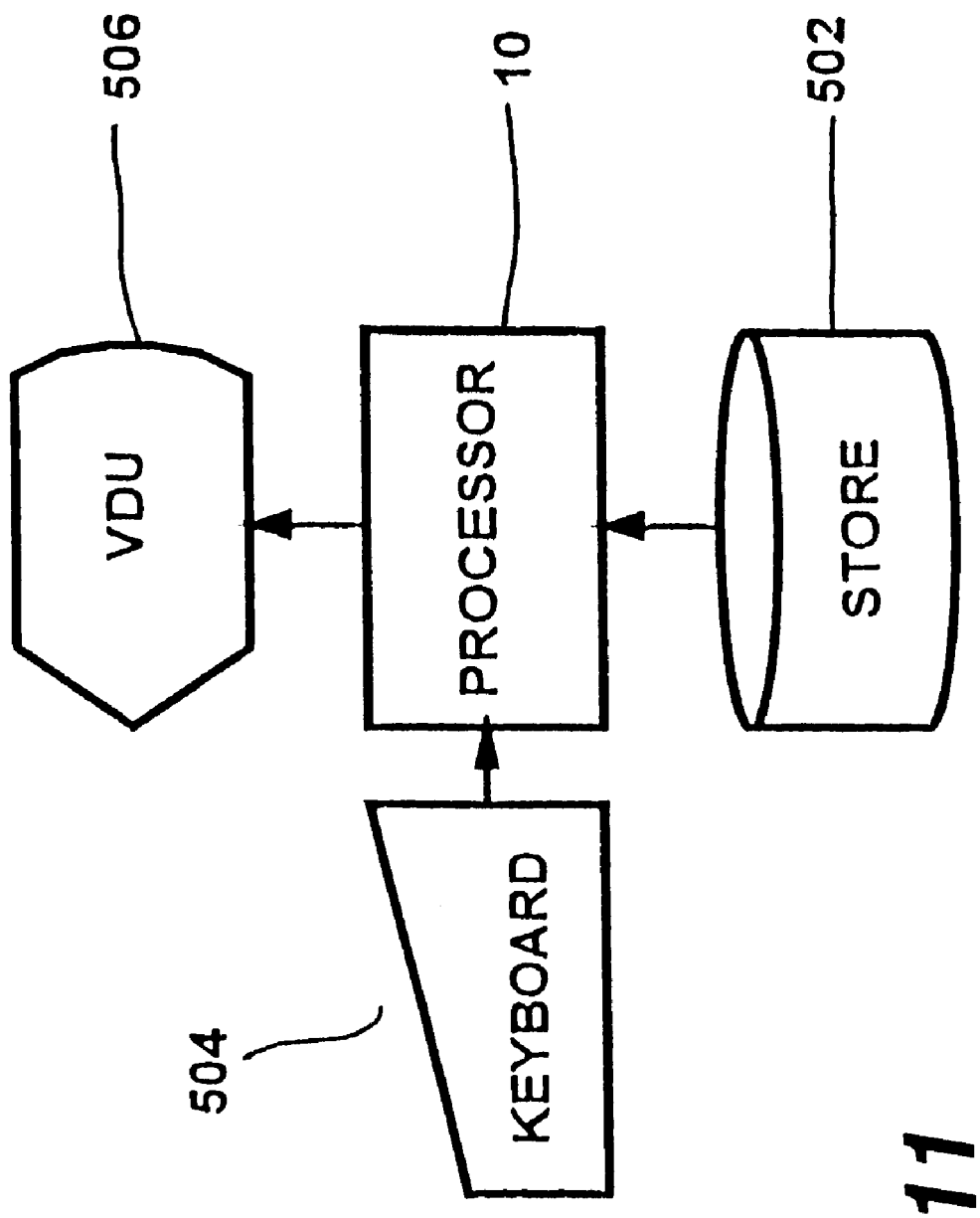
FIG. 11 is a block diagram of a further embodiment of the invention embodying that of FIG. 1.

Referring to FIG. 11, an embodiment of the invention useful for modelling crystal structures will now briefly be described. In general terms, this embodiment is similar to the disclosure of GB 2254458.

Within the store 502, data characterising the wave functions of different atoms are stored.

The keyboard 504 allows a user to input the atoms it is desired to model, and the optimiser 10 is arranged to access the store 502, and then to calculate the positions which such atoms would take in a crystal or compound structure, in accordance with the wave function data, to minimise the Hamiltonian equation (i.e. to find the positions of the atoms which correspond to a minimum energy configuration). Having done so, the processor 10 creates a screen displaying showing the structure, on the VDU 506.

Figure 12:
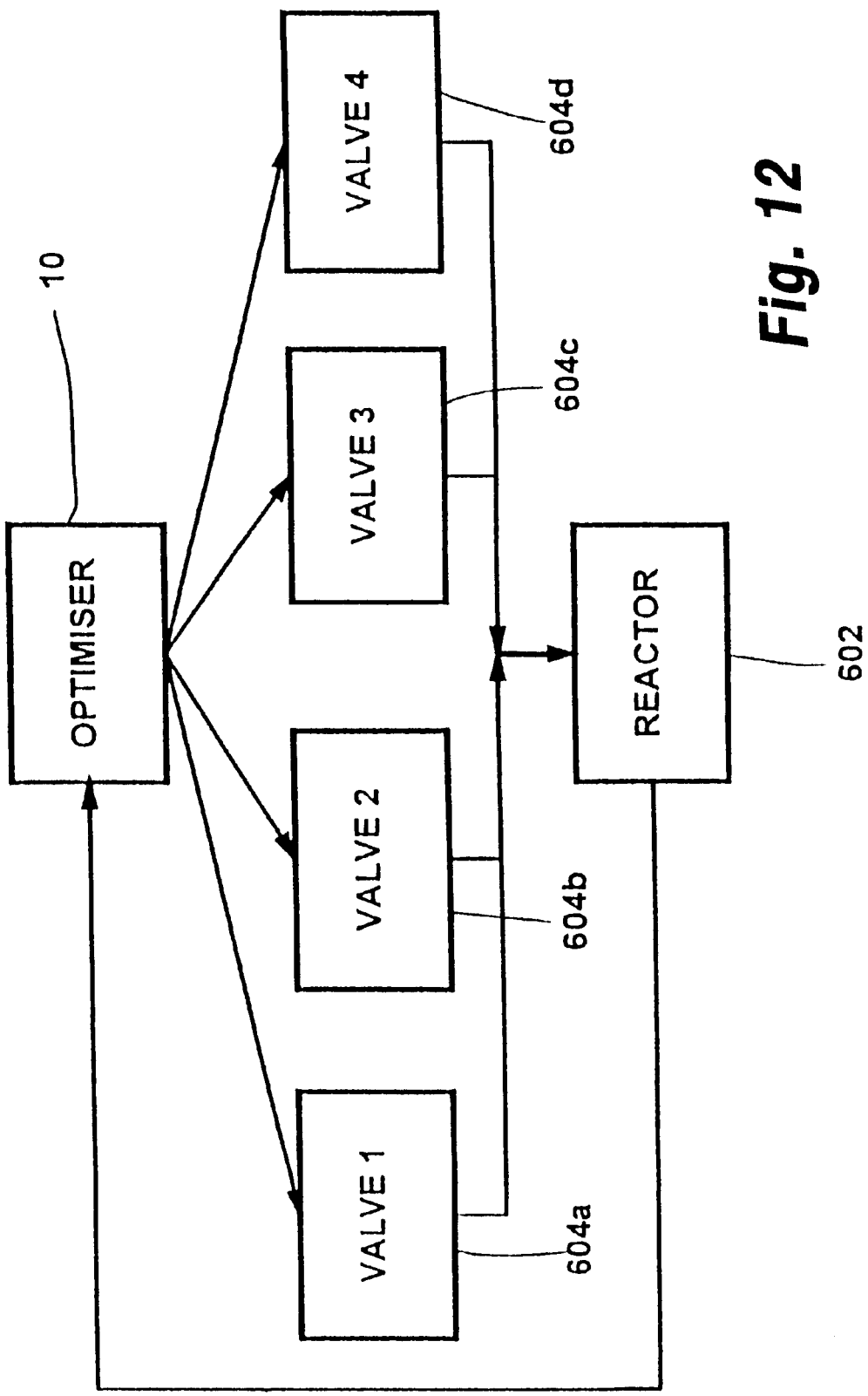
FIG. 12 is a block diagram of a further embodiment of the invention embodying that of FIG. 1.

FIG. 12 illustrates a further embodiment of the invention, comprising a chemical process control system. A reactor vessel 602 is fed from tanks of four ingredients via respective valves 604a–604d, which control the rate of supply of each component to the reactor vessel 602. The reactor vessel includes sensors such as a temperature sensor. The yield of the desired product is a function of the ratio of the components supplied via the valves 604, and temperature. The optimiser 10 is arranged to sense the temperature from the reactor vessel, and to determine optimum settings of the valves 604a–604d to achieve the optimum yield at the sensed temperature.

Many other embodiments of the invention will be clear from the foregoing including, without limitation, industrial process control embodiments; pattern matching embodiments in which a transform between two images is calculated (the embodiment given above of a motion vector generator is an example of this type of embodiment where only translational transformations are considered); signal processing embodiments (including signal encoding embodiments and particularly analysis-by-synthesis embodiments as described above in relation to speech) and signal correlating or filtering embodiments.

The foregoing examples have dealt with optimisation of a function directly. However, in many cases it is desired to optimise a function whilst not violating some constraints. For example, in the case of the telecommunications network management embodiment above, each telephone exchange is constrained to a maximum number of calls that it can handle. Likewise, in the case of the chemical process plant embodiment above, each valve can open only up to a predetermined point.

These are direct constraints on the possible input values, but more complex constraints may exist; for example, in the telecommunications network management example, there may be a constraint on the maximum routing distance such that calls should not be routed through more than X exchanges.

The present invention is also capable of optimising functions with constraints, in which case the function which is optimised is not the original function but a modified function composed of this original function with the addition of penalty terms where a constraint is violated. Thus, where a minimum in the original function is reached at which a constraint is not satisfied, the modified function value is increased because of the penalty term and the minimum in the original function does not therefore result in a minimum in the modified function. Further details are given in the paper "Constraint optimisation using dynamic local search" by the present inventors, to be published in a workshop Aug. 18, 1996, incorporated herein by reference in its entirety.

Other embodiments and modifications which will be apparent to the skilled person are to be understood to form part of the present invention, including design of communications network architecture; design and implementation of network restoration systems, and in processes such as a Work Manager.

What is claimed is:

1. A processor system for optimizing, said system comprising:

means for inputting data relating to a function of a plurality of input signals for which it is desired to find output values which give an optimum value of said function;

means for finding said output values by performing a plurality of cycles to reach a convergence, as determined by an exit criterion, each of which cycles comprises:

providing an old current value of each input signal;

selecting a test value of one or more said input signals;

generating said function from said selected test value or values;

selecting a new current value in dependence upon the relationship between the value of the function for the test value and the value of the function for the old current value, said test values including values close to said old current values so as to move said input signal towards a local convergence; and means for outputting said output values;

said finding means being adapted to perform said cycles wherein during some but not all of said cycles, prior to detection of said exit criterion, said test value of one or more said input signals is selected to lie remotely within the range of said input signal to said old current value, so as to move said input signal towards a global convergence prior to detection of said exit criterion.

2. A system as in claim 1, in which selecting said new current value comprises calculating a value lying between said current value and said test value.

3. A system as in claim 2, in which calculating comprises calculating said new current value to lie substantially closer to said current value than to said test value.

4. A system as in claim 1 in which said of selecting a test value comprises calculating said test value to progressively reduce the offset from said old current value in successive said cycles.

5. A system as in claim 1 further comprising:

means for generating a pseudo-random number, in which said selecting a test value comprises generating a said pseudo-random number, and calculating said test value from said old current value in accordance with said pseudo-random number.

6. A system as in claim 1 in which each said cycle comprises first and second said steps of selecting a test value, the first step comprising generating a test value below the old current value and the second step comprising generating a test value above the old current value of the or each said input signal.

7. A system as in claim 1 in which selecting the new current value comprises retaining the old current value unless the value of the function at each test position within the cycle is closer to optimal than that at the old current value.

8. A system as in claim 1 in which said test values comprise remote values in a predetermined proportion of said cycles.

9. A system as in claim 8, in which said proportion exceeds half of said cycles.

10. A system as in claim 8 further comprising:

means for generating a pseudo-random number, in which said finding means is arranged, at each cycle, to generate a said pseudo-random number; compare said pseudo-random number with a predetermined threshold, and select either a local or a remote test value in accordance with the results of the comparison.

11. Telecommunications apparatus comprising a system as in claim 1.

12. Apparatus as in claim 11, arranged to control the operation of a telecommunications network comprising a plurality of routing nodes.

13. Signal processing apparatus comprising a system as in claim 1.

14. Apparatus as in claim 13, arranged to process a digitized speech signal.

15. Apparatus as in claim 13, arranged to process an image signal.

16. Apparatus as in claim 13, arranged to derive a transform between two signals.

17. Apparatus as in claim 16, in which said transform is between two successive frames of a video signal.

18. Apparatus as in claim 16, in which said transform is between two different images.

19. Industrial process control apparatus comprising a system as in claim 1.

20. Apparatus as in claim 19, comprising means for controlling input quantities of starting materials, to achieve desired output material conditions.

21. An optimizer processor system for finding preferred values of one or more input signals corresponding to optima of a function of the input signals, the system comprising:

means for inputting data defining a function to be optimized means for outputting data relating to input values corresponding to said optima; and means for performing a plurality of cycles to reach a convergence, each of which cycles comprises:

providing an old current value of each input signal;

selecting a test value of one or more said input signals to lie remotely within the range of said input signal to said old current value, so as to move said input signal towards a global convergence;

generating said function from said selected test value or values; and selecting a new current value in dependence upon the relationship between the value of the function for the test value and the value of the function for the old current value, wherein selecting said new current value comprises calculating a value lying between said current value and said test value, and substantially closer to said current value than to said test value.

22. A system as in claim 21, in which selecting a test value comprises calculating said test value to progressively reduce the offset from said old current value in successive said cycles.

23. A method of finding preferred values of one or more input signals corresponding to optima of a function of the input signals, the method comprising performing a plurality of cycles to reach a convergence defined by an exit criterion, each of which cycles comprises:

providing an old current value of each input signal;

selecting a test value of one or more said input signals;

generating said function from said selected test value or values;

selecting a new current value in dependence upon the relationship between the value of the function for the test value and the value of the function for the old current value, said test values including values close to said old current values so as to move said input signal towards a local convergence; and testing for said exit criterion wherein during some but not all of said cycles, prior to reaching said exit criterion, said test value of one or more said input signals is selected to lie remotely within the range of said input signal to said old current value, so as to move said input signal towards a global convergence prior to completion of said local convergence.

24. A method as in claim 23, in which selecting said new current value comprises calculating a value lying between said current value and said test value.

25. A method as in claim 24, in which the calculating comprises calculating said new current value to lie substantially closer to said current value than to said test value.

26. A method as in claim 23 in which said selecting a test value comprises calculating said test value to progressively reduce the offset from said old current value in successive said cycles.

27. A method as in claim 23 in which said selecting a test value comprises generating a pseudo-random number, and calculating said test value from said old current value in accordance with said pseudo-random number.

28. A method as in claim 23 in which each said cycle comprises first and second said steps of selecting a test value, the first step comprising generating a test value below the old current value and the second step comprising generating a test value above the old current value of the or each said input signal.

29. A method as in claim 23 in which selecting the new current value comprises retaining the old current value unless the value of the function at the or each test position within the cycle is closer to optimal than that at the old current value.

30. A method as in claim 23 in which said test values comprises remote values in a predetermined proportion of said cycles.

31. A method as in claim 30, in which said proportion exceeds half of said cycles.

32. A method as in claim 30 further comprising, at each cycle, generating a pseudo-random number; comparing said pseudo-random number with a predetermined threshold, and selecting either a local or a remote test value in accordance with the results of the comparison.

33. A method of finding preferred values of one or more input signals corresponding to optima of a function of the input signals, the method comprising performing a plurality of cycles to reach a convergence, each of which cycles comprises:

providing an old current value of each input signal;

selecting a test value of one or more said input signals to lie remotely within the range of said input signal to said old current value, so as to move said input signal towards a global convergence;

generating said function from said selected test value or values; and selecting a new current value in dependence upon the relationship between the value of the function for the test value and the value of the function for the old current value, in which the step of selecting said new current value comprises calculating a value lying between said current value and said test value, and substantially closer to said current value than to said test value.

34. A method as in claim 33, in which selecting a test value comprises calculating said test value to progressively reduce the offset from said old current value in successive said cycles.

* * * * *